(12) United States Patent
Soundararajan et al.

(10) Patent No.: US 11,597,052 B2
(45) Date of Patent: Mar. 7, 2023

(54) TEMPERATURE CONTROL OF CHEMICAL MECHANICAL POLISHING

(71) Applicant: Applied Materials, Inc., Santa Clara, CA (US)

(72) Inventors: Hari Soundararajan, Sunnyvale, CA (US); Shou-Sung Chang, Mountain View, CA (US); Haosheng Wu, San Jose, CA (US); Jianshe Tang, San Jose, CA (US); Jeonghoon Oh, Saratoga, CA (US); Rajeev Bajaj, Fremont, CA (US); Andrew Siordia, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 584 days.

(21) Appl. No.: 16/448,980

(22) Filed: Jun. 21, 2019

(65) Prior Publication Data

US 2020/0001427 A1    Jan. 2, 2020

Related U.S. Application Data

(60) Provisional application No. 62/690,876, filed on Jun. 27, 2018, provisional application No. 62/778,201, filed on Dec. 11, 2018.

(51) Int. Cl.
*B24B 49/00* (2012.01)
*B24B 37/015* (2012.01)
(Continued)

(52) U.S. Cl.
CPC .......... *B24B 37/015* (2013.01); *B24B 37/20* (2013.01); *B24B 37/27* (2013.01); *B24B 57/02* (2013.01); *G05D 23/2401* (2013.01)

(58) Field of Classification Search
CPC ....... B24B 37/015; B24B 37/20; B24B 37/27; B24B 57/02; G05D 23/2401
(Continued)

(56) References Cited

U.S. PATENT DOCUMENTS

| 4,450,652 | A | 5/1984 | Walsh |
| 4,919,232 | A | 4/1990 | Lofton |

(Continued)

FOREIGN PATENT DOCUMENTS

| CN | 101500721 | 8/2009 |
| CN | 102179757 | 9/2011 |

(Continued)

OTHER PUBLICATIONS

PCT International Search Report and Written Opinion in International Appln. No. PCT/US2020/045780, dated Nov. 17, 2020, 11 pages.

(Continued)

*Primary Examiner* — Joseph J Hail
*Assistant Examiner* — Shantese L McDonald
(74) *Attorney, Agent, or Firm* — Fish & Richardson P.C.

(57) ABSTRACT

A chemical mechanical polishing apparatus includes a platen to hold a polishing pad, a carrier to hold a substrate against a polishing surface of the polishing pad during a polishing process, a dispenser to supply a polishing liquid to the polishing surface, and a temperature control system including a body configured to contact the polishing surface or the polishing liquid on the polishing surface. The body supports a thermal control module positioned over the polishing pad.

17 Claims, 4 Drawing Sheets

(51) Int. Cl.
  *B24B 37/20* (2012.01)
  *B24B 57/02* (2006.01)
  *B24B 37/27* (2012.01)
  *G05D 23/24* (2006.01)

(58) Field of Classification Search
  USPC .......................... 451/7, 5, 41, 53, 287, 443
  See application file for complete search history.

(56) References Cited

U.S. PATENT DOCUMENTS

| | | |
|---|---|---|
| 5,088,242 A | 2/1992 | Lubbering et al. |
| 5,196,353 A | 3/1993 | Sandhu et al. |
| 5,478,435 A | 12/1995 | Murphy et al. |
| 5,597,442 A | 1/1997 | Chen et al. |
| 5,643,050 A | 7/1997 | Chen |
| 5,709,593 A | 1/1998 | Guthrie |
| 5,722,875 A | 3/1998 | Iwashita et al. |
| 5,738,574 A | 4/1998 | Tolles et al. |
| 5,762,544 A | 6/1998 | Zuniga et al. |
| 5,765,394 A | 6/1998 | Rhoades |
| 5,851,135 A | 12/1998 | Sandhu et al. |
| 5,851,846 A | 12/1998 | Matsui et al. |
| 5,868,003 A | 2/1999 | Simas et al. |
| 5,873,769 A | 2/1999 | Chiou et al. |
| 5,893,753 A | 4/1999 | Hempel, Jr. |
| 5,957,750 A | 9/1999 | Brunelli |
| 6,000,997 A | 12/1999 | Kao et al. |
| 6,012,967 A | 1/2000 | Satake et al. |
| 6,023,941 A | 2/2000 | Rhoades |
| 6,095,898 A | 8/2000 | Hennofer et al. |
| 6,121,144 A | 9/2000 | Marcyk et al. |
| 6,151,913 A | 11/2000 | Lewis et al. |
| 6,159,073 A | 12/2000 | Wiswesser et al. |
| 6,257,954 B1 | 7/2001 | Ng et al. |
| 6,257,955 B1 | 7/2001 | Springer et al. |
| 6,264,789 B1 | 7/2001 | Pandey et al. |
| 6,280,289 B1 | 8/2001 | Wiswesser et al. |
| 6,315,635 B1 | 11/2001 | Lin |
| 6,319,098 B1 | 11/2001 | Osterheld et al. |
| 6,399,501 B2 | 6/2002 | Birang et al. |
| 6,422,927 B1 | 7/2002 | Zuniga |
| 6,461,980 B1 | 10/2002 | Cheung et al. |
| 6,494,765 B2 | 12/2002 | Gitis et al. |
| 6,503,131 B1 | 1/2003 | Franklin et al. |
| 6,543,251 B1 | 4/2003 | Gasteyer, III et al. |
| 6,640,151 B1 | 10/2003 | Somekh et al. |
| 6,647,309 B1 | 11/2003 | Bone |
| 6,776,692 B1 | 8/2004 | Zuniga et al. |
| 6,829,559 B2 | 12/2004 | Bultman et al. |
| 6,896,586 B2 | 5/2005 | Pham et al. |
| 7,008,295 B2 | 3/2006 | Wiswesser et al. |
| 7,016,750 B2 | 3/2006 | Steinkirchner et al. |
| 7,196,782 B2 | 3/2007 | Fielden et al. |
| 7,201,634 B1 | 4/2007 | Naujok et al. |
| 8,172,641 B2 * | 5/2012 | Ho .................. B24B 55/02 451/7 |
| 8,349,247 B2 | 1/2013 | Ueno |
| 8,439,723 B2 | 5/2013 | Marks et al. |
| 8,740,667 B2 | 6/2014 | Kodera et al. |
| 8,845,391 B2 | 9/2014 | Sone et al. |
| 9,005,999 B2 | 4/2015 | Xu et al. |
| 9,067,296 B2 | 6/2015 | Ono et al. |
| 9,475,167 B2 † | 10/2016 | Maruyama |
| 9,539,699 B2 | 1/2017 | Shinozaki |
| 9,579,768 B2 | 2/2017 | Motoshima et al. |
| 9,630,295 B2 | 4/2017 | Peng et al. |
| 9,782,870 B2 * | 10/2017 | Maruyama ............ B24B 37/015 |
| 10,035,238 B2 | 7/2018 | Maruyama et al. |
| 11,103,970 B2 | 8/2021 | Huang et al. |
| 2001/0055940 A1 | 12/2001 | Swanson |
| 2002/0039874 A1 | 4/2002 | Hecker et al. |
| 2002/0058469 A1 | 5/2002 | Pinheiro et al. |
| 2002/0065002 A1 | 5/2002 | Handa et al. |
| 2002/0065022 A1 | 5/2002 | Iwasaki et al. |
| 2002/0068454 A1 | 6/2002 | Sun et al. |
| 2003/0055526 A1 | 3/2003 | Avanzino et al. |
| 2003/0211816 A1 | 11/2003 | Liu et al. |
| 2004/0087248 A1 | 5/2004 | Hirokawa |
| 2005/0024047 A1 | 2/2005 | Miller et al. |
| 2005/0042877 A1 | 2/2005 | Salfelder et al. |
| 2005/0181709 A1 | 8/2005 | Jiang et al. |
| 2005/0211377 A1 | 9/2005 | Chen et al. |
| 2007/0035020 A1 | 2/2007 | Umemoto |
| 2007/0135020 A1 | 6/2007 | Nabeya |
| 2007/0205112 A1 | 9/2007 | Kodera et al. |
| 2007/0227901 A1 * | 10/2007 | Hu ........................ C25D 7/00 205/640 |
| 2007/0238395 A1 | 10/2007 | Kimura et al. |
| 2008/0311823 A1 * | 12/2008 | Aiyoshizawa .......... B24B 55/02 451/7 |
| 2009/0258573 A1 | 10/2009 | Muldowney et al. |
| 2010/0047424 A1 | 2/2010 | Cousin et al. |
| 2010/0081360 A1 | 4/2010 | Xu et al. |
| 2010/0227435 A1 | 9/2010 | Park et al. |
| 2010/0279435 A1 | 11/2010 | Xu et al. |
| 2011/0159782 A1 | 6/2011 | Sone et al. |
| 2012/0034846 A1 | 2/2012 | Minamihaba et al. |
| 2012/0040592 A1 | 2/2012 | Chen et al. |
| 2012/0190273 A1 | 7/2012 | Ono et al. |
| 2012/0220196 A1 * | 8/2012 | Maruyama ............ B24B 37/04 451/7 |
| 2013/0023186 A1 | 1/2013 | Motoshima et al. |
| 2013/0045596 A1 | 2/2013 | Eda et al. |
| 2014/0024297 A1 | 1/2014 | Cahndraeskaran et al. |
| 2014/0187122 A1 | 7/2014 | Ishibashi |
| 2015/0024661 A1 | 1/2015 | Peng et al. |
| 2015/0079881 A1 | 3/2015 | Maruyama et al. |
| 2015/0196988 A1 | 7/2015 | Watanabe |
| 2015/0224621 A1 | 8/2015 | Motoshima et al. |
| 2015/0224623 A1 | 8/2015 | Xu et al. |
| 2017/0232572 A1 | 8/2017 | Brown |
| 2018/0236631 A1 | 8/2018 | Eto et al. |
| 2019/0126428 A1 | 5/2019 | Martuyama et al. |
| 2019/0143476 A1 | 5/2019 | Wu |
| 2020/0001425 A1 | 1/2020 | Huang |
| 2020/0001426 A1 | 1/2020 | Soundararajan et al. |
| 2020/0262024 A1 | 8/2020 | Chang et al. |
| 2021/0046602 A1 | 2/2021 | Wu et al. |
| 2021/0046603 A1 | 2/2021 | Wu et al. |
| 2021/0046604 A1 | 2/2021 | Wu et al. |

FOREIGN PATENT DOCUMENTS

| | | |
|---|---|---|
| CN | 102419603 | 4/2012 |
| CN | 207171777 | 4/2018 |
| JP | 11-033897 | 2/1999 |
| JP | 2003-197586 | 7/2003 |
| JP | 2004-202666 | 7/2004 |
| JP | 2004-306173 | 11/2004 |
| JP | 2005-311246 | 11/2005 |
| JP | 2007-035973 | 2/2007 |
| JP | 2013-042066 | 2/2013 |
| JP | 2013-099814 | 5/2013 |
| JP | 2014-188596 | 10/2014 |
| JP | 2015-131361 | 7/2015 |
| JP | 2018-101738 | 6/2018 |
| KR | 2006-00763 3 2 | 7/2006 |
| KR | 2009-0046468 | 5/2009 |
| KR | 2012-0084671 | 7/2012 |
| KR | 101816694 | 1/2018 |
| KR | 20200056015 | 5/2020 |
| TW | 202000368 | 1/2020 |
| WO | WO 90/13735 | 11/1990 |
| WO | WO 2000/58054 | 10/2000 |
| WO | WO 02/17411 | 2/2002 |

(56) References Cited

FOREIGN PATENT DOCUMENTS

WO    WO 2014/113220     7/2014
WO    WO 2020/005749     1/2020

OTHER PUBLICATIONS

PCT International Search Report and Written Opinion in International Appln. No. PCT/US2020/045771, dated Nov. 25, 2020, 10 pages.
Machine Generated English Translation of CN 207171777, Published on Apr. 3, 2018, 25 pages (CN 207171777 submitted with Information Disclosure Statement on Jun. 22, 2022).

\* cited by examiner
† cited by third party

TEMPERATURE CONTROL OF CHEMICAL MECHANICAL POLISHING

CROSS-REFERENCE TO RELATED APPLICATIONS

This application claims priority to U.S. Provisional Application Ser. No. 62/778,201, filed on Dec. 11, 2018, and to U.S. Provisional Application Ser. No. 62/690,876, filed on Jun. 27, 2018, the entire disclosures of which are incorporated by reference.

TECHNICAL FIELD

The present disclosure relates to chemical mechanical polishing (CMP), and more specifically to temperature control during chemical mechanical polishing.

BACKGROUND

An integrated circuit is typically formed on a substrate by the sequential deposition of conductive, semiconductive, or insulative layers on a semiconductor wafer. A variety of fabrication processes require planarization of a layer on the substrate. For example, one fabrication step involves depositing a filler layer over a non-planar surface and planarizing the filler layer. For certain applications, the filler layer is planarized until the top surface of a patterned layer is exposed. For example, a metal layer can be deposited on a patterned insulative layer to fill the trenches and holes in the insulative layer. After planarization, the remaining portions of the metal in the trenches and holes of the patterned layer form vias, plugs, and lines to provide conductive paths between thin film circuits on the substrate. As another example, a dielectric layer can be deposited over a patterned conductive layer, and then planarized to enable subsequent photolithographic steps.

Chemical mechanical polishing (CMP) is one accepted method of planarization. This planarization method typically requires that the substrate be mounted on a carrier head. The exposed surface of the substrate is typically placed against a rotating polishing pad. The carrier head provides a controllable load on the substrate to push it against the polishing pad. A polishing slurry with abrasive particles is typically supplied to the surface of the polishing pad.

SUMMARY

In one aspect, a chemical mechanical polishing apparatus includes a platen to hold a polishing pad, a carrier to hold a substrate against a polishing surface of the polishing pad during a polishing process, and a temperature control system. The temperature control system includes a plurality of thermal control modules positioned above the polishing pad at a plurality of different radial positions. Each thermal control module of the plurality of thermal control modules is configured to independently heat or cool a radial region of the polishing pad.

In another aspect, a chemical mechanical polishing apparatus includes a platen to hold a polishing pad, a carrier to hold a substrate against a polishing surface of the polishing pad during a polishing process, a temperature control system including a body including a thermal control module positioned over the polishing pad, and a first actuator to adjust a vertical position of the body relative to the polishing pad.

In another aspect, a chemical mechanical polishing apparatus includes a platen to hold a polishing pad, a carrier to hold a substrate against a polishing surface of the polishing pad during a polishing process, a dispenser to supply a polishing liquid to the polishing surface, and a temperature control system including a body configured to contact the polishing surface or the polishing liquid on the polishing surface. The body supports a thermal control module positioned over the polishing pad.

Implementations of any of the above aspects may include one or more of the following features.

Each thermal control module can include one or more of an infrared light source, a thermoelectric heat pump, a heat exchanger, a resistive heater, and a fluid dispenser. One or more temperature sensors may measure a plurality of temperature measurements of the polishing surface at a plurality of different radial positions. A controller may be configured to receive the plurality of temperature measurements and control the plurality of thermal control modules to bring a temperature profile of the polishing pad closer to a desired temperature profile.

A base may be positioned to a side of the platen, and the body may extend laterally from the base over the polishing pad. A second actuator may cause the body to sweep laterally across the polishing pad.

A layer of the body may be positioned between the thermal control module and the body. The thermal control module may directly contact the polishing pad or the polishing liquid. At least a portion of the body that contacts the polishing pad or polishing liquid may be a ceramic. At least a portion of the body that contacts the polishing pad or polishing liquid may include silicon carbide, silicon nitride or aluminum nitride.

An actuator may adjust a vertical position of the body relative to the polishing pad. A bottom surface of the body may contact the polishing surface. A bottom surface of the body contacts the polishing liquid on the polishing surface. The thermal control module may include a stack with a thermoelectric heat pump and a heat exchanger. The heat exchanger may be above the thermoelectric heat pump.

A controller may be configured to control a current to the thermoelectric heat pump to cause the heat pump to drive heat to or from the polishing pad, and to control a temperature or flow rate of fluid passing through the heat exchanger to cause the heat exchanger to raise or lower a temperature of a top surface of the thermoelectric heat pump.

Implementations may include one or more of the following advantages. Temperature variation over a polishing operation can be reduced. This can improve predictability of polishing the polishing process. Temperature variation from one polishing operation to another polishing operation can be reduced. This can improve wafer-to-wafer uniformity and improve repeatability of the polishing process. Temperature variation across a substrate can be reduced. This can improve within-wafer uniformity.

The details of one or more implementations are set forth in the accompanying drawings and the description below. Other aspects, features, and advantages will be apparent from the description and drawings, and from the claims.

DETAILED DESCRIPTION

Figure 1:
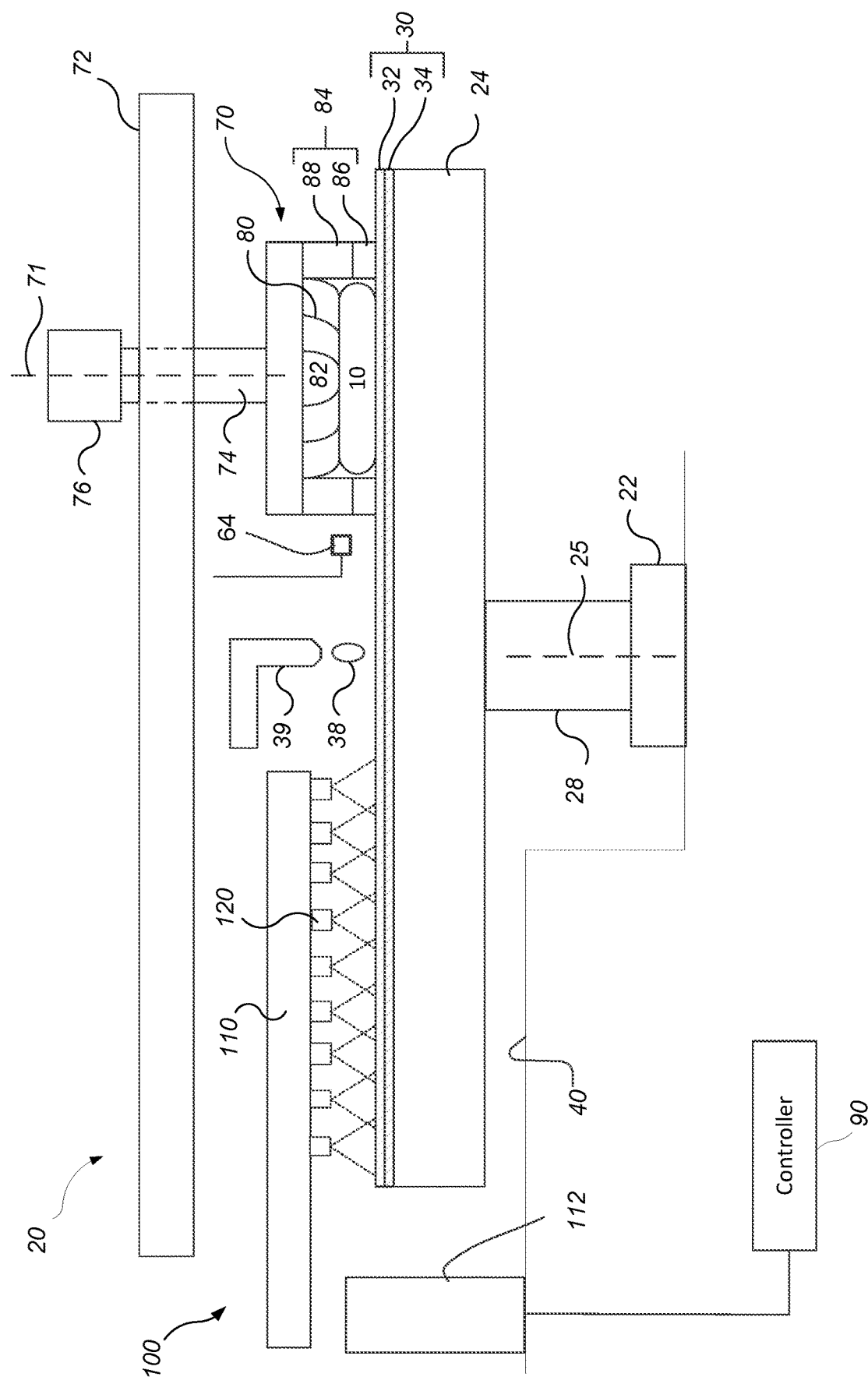
FIG. 1 illustrates a schematic cross-sectional view of an example of a polishing apparatus.

Chemical mechanical polishing operates by a combination of mechanical abrasion and chemical etching at the interface between the substrate, polishing liquid, and polishing pad. During the polishing process, a significant amount of heat is generated due to friction between the surface of the substrate and the polishing pad. In addition, some processes also include an in-situ pad conditioning step in which a conditioning disk, e.g., a disk coated with abrasive diamond particles, is pressed against the rotating polishing pad to condition and texture the polishing pad surface. The abrasion of the conditioning process can also generate heat. For example, in a typical one minute copper CMP process with a nominal downforce pressure of 2 psi and removal rate of 8000 Å/min, the surface temperature of a polyurethane polishing pad can rise by about 30° C.

Both the chemical-related variables in a CMP process, e.g., as the initiation and rates of the participating reactions, and the mechanical-related variables, e.g., the surface friction coefficient and viscoelasticity of the polishing pad, are strongly temperature dependent. Consequently, variation in the surface temperature of the polishing pad result in changes in removal rate, polishing uniformity, erosion, dishing, and residue. By more tightly controlling the temperature of the surface of the polishing pad during polishing, variation in temperature can be reduced, and polishing performance, e.g., as measured by within-wafer non-uniformity or wafer-to-wafer non-uniformity, can be improved.

Some techniques have been proposed for temperature control. As one example, coolant could be run through the platen. As another example, a temperature of the polishing liquid delivered to the polishing pad can be controlled. However, these techniques can be insufficient. For example, the platen must supply or draw heat through the body of the polishing pad itself to control the temperature of the polishing surface. The polishing pad is typically a plastic material and a poor thermal conductor, so that thermal control from the platen can be difficult. On the other hand, the polishing liquid may not have a significant thermal mass.

A technique that may address these issues is to place a temperature-controlled body in direct contact with the polishing surface of the polishing pad, or in direct contact with the polishing liquid on the polishing pad. The temperature of this body can be varied across its length, thus providing radial control of the temperature of the polishing pad.

An addition issue is that the temperature increase is often not uniform along the radius of the rotating polishing pad during the CMP process. Without being limited to any particular theory, different sweep profiles of the polishing head and pad conditioner sometimes can have different dwell times in each radial zone of the polishing pad. In addition, the relative linear velocity between the polishing pad and the polishing head and/or the pad conditioner also varies along the radius of the polishing pad. These effects can contribute to non-uniform heat generation on the polishing pad surface, which can result in within-wafer removal rate variations.

A technique that may address these issues is to have a plurality of temperature control modules spaced along the radius of the polishing pad. Each temperature control module contains a thermal transfer element positioned above the polishing pad, and the thermal transfer element can include a cooling element or a heating element or both. Each temperature control module can independently provide selective amount of cooling or heating into the corresponding radial zone on the rotating polishing pad that travels underneath each module. In this way, temperature can be controlled for each radial zone on the surface of the polishing pad, which permits reduction of temperature non-uniformity.

Figure 2:
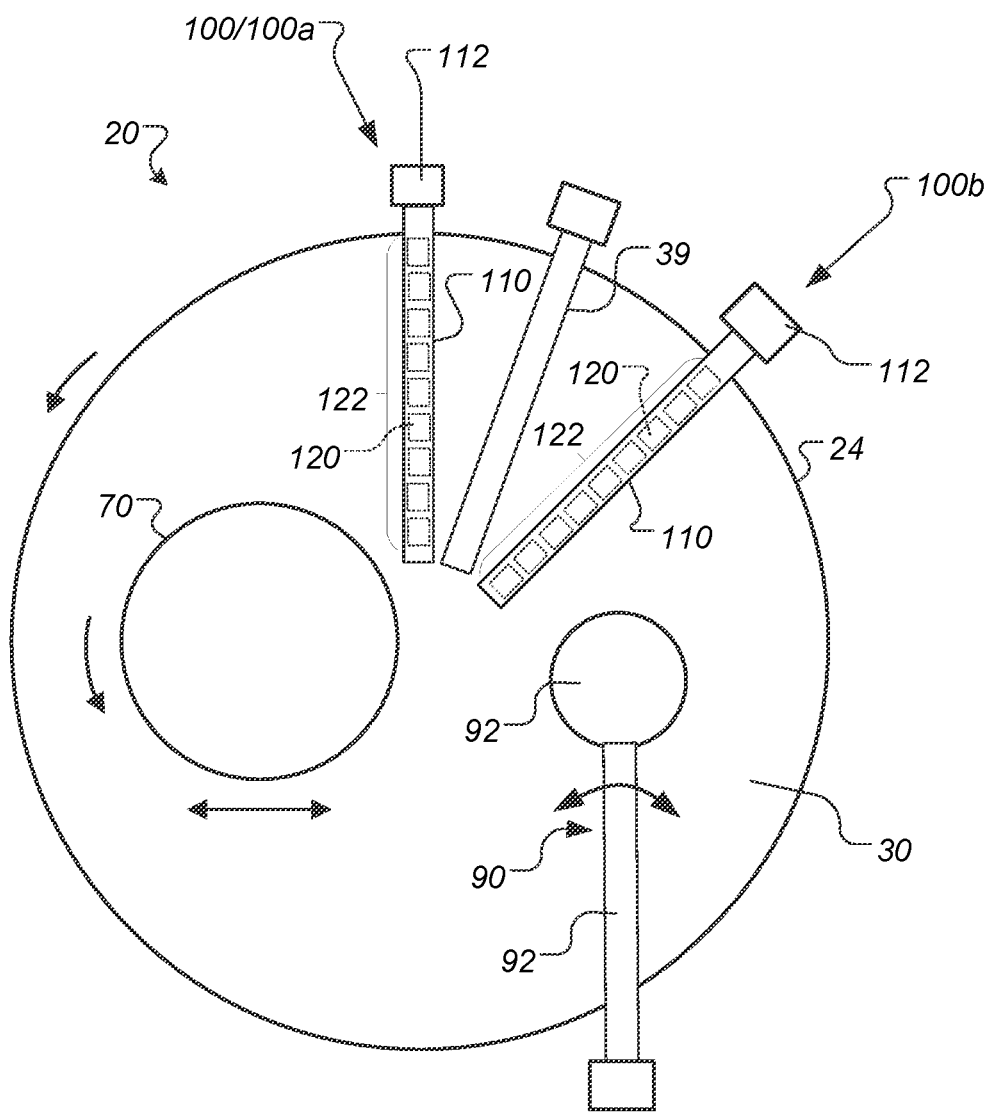
FIG. 2 illustrates a schematic top view of an example chemical mechanical polishing apparatus.

FIGS. 1 and 2 illustrate an example of a polishing station 20 of a chemical mechanical polishing system. The polishing station 20 includes a rotatable disk-shaped platen 24 on which a polishing pad 30 is situated. The platen 24 is operable to rotate about an axis 25. For example, a motor 22 can turn a drive shaft 28 to rotate the platen 24. The polishing pad 30 can be a two-layer polishing pad with an outer polishing layer 34 and a softer backing layer 32.

The polishing station 20 can include a supply port or a combined supply-rinse arm 39 to dispense a polishing liquid 38, such as an abrasive slurry, onto the polishing pad 30. The polishing station 20 can include a pad conditioner apparatus 90 with a conditioning disk 92 (see FIG. 2) to maintain the surface roughness of the polishing pad 30. The conditioning disk 90 can be positioned at the end of an arm 94 that can swing so as to sweep the disk 90 radially across the polishing pad 30.

A carrier head 70 is operable to hold a substrate 10 against the polishing pad 30. The carrier head 70 is suspended from a support structure 72, e.g., a carousel or a track, and is connected by a drive shaft 74 to a carrier head rotation motor 76 so that the carrier head can rotate about an axis 71. Optionally, the carrier head 70 can oscillate laterally, e.g., on sliders on the carousel, by movement along the track, or by rotational oscillation of the carousel itself.

The carrier head 70 can include a retaining ring 84 to hold the substrate. In some implementations, the retaining ring 84 may include a highly conductive portion, e.g., the carrier ring can include a thin lower plastic portion 86 that contacts the polishing pad, and a thick upper conductive portion 88. In some implementations, the highly conductive portion is a metal, e.g., the same metal as the layer being polished, e.g., copper.

In operation, the platen is rotated about its central axis 25, and the carrier head is rotated about its central axis 71 and translated laterally across the top surface of the polishing pad 30. Where there are multiple carrier heads, each carrier head 70 can have independent control of its polishing parameters, for example each carrier head can independently control the pressure applied to each respective substrate.

The carrier head 70 can include a flexible membrane 80 having a substrate mounting surface to contact the back side of the substrate 10, and a plurality of pressurizable chambers 82 to apply different pressures to different zones, e.g., different radial zones, on the substrate 10. The carrier head can also include a retaining ring 84 to hold the substrate.

In some implementations, the polishing station 20 includes a temperature sensor 64 to monitor a temperature in the polishing station or a component of/in the polishing station, e.g., the temperature of the polishing pad and/or slurry on the polishing pad. For example, the temperature sensor 64 could be an infrared (IR) sensor, e.g., an IR camera, positioned above the polishing pad 30 and configured to measure the temperature of the polishing pad 30 and/or slurry 38 on the polishing pad. In particular, the temperature sensor 64 can be configured to measure the temperature at multiple points along the radius of the polishing pad 30 in order to generate a radial temperature profile. For example, the IR camera can have a field of view that spans the radius of the polishing pad 30.

In some implementations, the temperature sensor is a contact sensor rather than a non-contact sensor. For example, the temperature sensor 64 can be thermocouple or IR thermometer positioned on or in the platen 24. In addition, the temperature sensor 64 can be in direct contact with the polishing pad.

In some implementations, multiple temperature sensors could be spaced at different radial positions across the polishing pad 30 in order to provide the temperature at multiple points along the radius of the polishing pad 30. This technique could be use in the alternative or in addition to an IR camera.

Although illustrated in FIG. 1 as positioned to monitor the temperature of the polishing pad 30 and/or slurry 38 on the pad 30, the temperature sensor 64 could be positioned inside the carrier head 70 to measure the temperature of the substrate 10. The temperature sensor 64 can be in direct contact (i.e., a contacting sensor) with the semiconductor wafer of the substrate 10. In some implementations, multiple temperature sensors are included in the polishing station 22, e.g., to measure temperatures of different components of/in the polishing station.

The polishing system 20 also includes a temperature control system 100 to control the temperature of the polishing pad 30 and/or slurry 38 on the polishing pad. The temperature control system 100 includes at least one elongated body 110 that extends over the polishing pad 30 from an edge of the polishing pad to at or near (e.g., within 5% of the total radius of the polishing pad) the center of polishing pad 30. For example, the body 110 can be an arm supported by a base 112 to extend over the polishing pad 30. The base 112 can be supported on the same frame 40 as the platen 24. The body 110 is positioned to avoid colliding with other hardware components such as the polishing head 70, pad conditioning disk 90, and the slurry dispensing arm 39.

Figure 5:
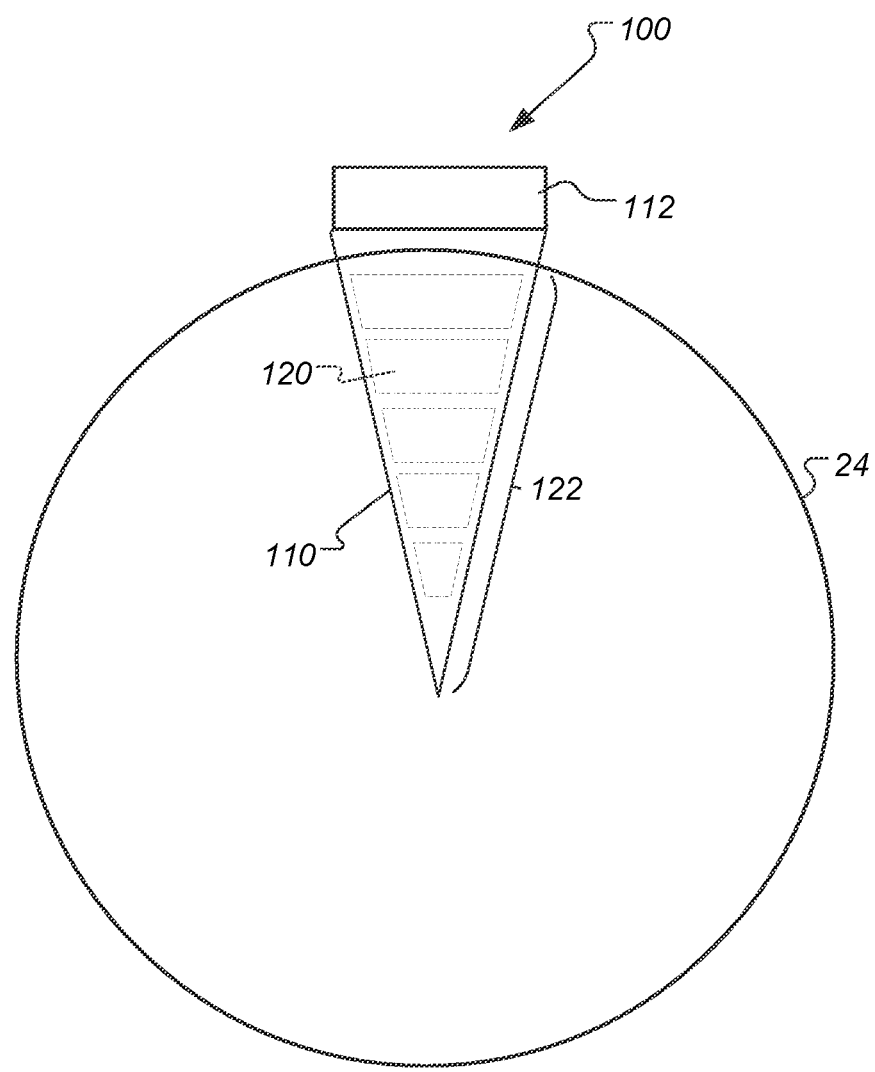
FIG. 5 illustrates a schematic top view of another example chemical mechanical polishing apparatus.

The body 110 can be generally linear and can have a substantially uniform width along its length, although other shapes such as a circular sector (aka a "pie slice"), an arc or triangular wedge (all as top views of the system) can be used to achieve a desired thermal transfer area between the body 110 and the polishing pad surface. In particular, the plurality of thermal control modules can be supported by a wedge-shaped arm that is wider at an end further from the axis. For example, FIG. 5 illustrates the body 110 of the temperature control system 100 as a wedge (other elements of the polishing apparatus are not shown in FIG. 1 for simplicity).

Returning to FIGS. 1 and 2, the body 110 can be in direct contact with the polishing pad 30. Alternatively, the body can be slightly separated from the polishing pad 30, still be in contact with a layer of polishing liquid, e.g., the slurry, on the surface of the polishing pad 30. In some implementations, e.g., non-contact heaters, such as IR lamps, the body is suspended above the polishing pad 30 without contacting the polishing pad or the polishing. The base 112 can include an actuator, e.g., a linear actuator, to raise or lower the body 110.

The lateral position of the body 110 can be fixed, or can be controlled by another actuator. For example, the body 110 can be driven by a motor in the base 112 to sweep laterally across the polishing pad. For example, the body 110 can be driven to perform a sweep motion to avoid collision with other hardware components and/or to increase the effective thermal transfer area on the polishing pad surface.

The body 110 can include multiple temperature control modules 120 positioned in a line. For example, the thermal control modules 120 can be positioned along a radius of the platen, e.g., spaced along the radial direction of the polishing pad. Each temperature control module 120 contains a thermal transfer element, which can be include a cooling element or a heating element or both. Each temperature control module 120 can independently provide a selective amount of cooling or heating into the corresponding radial zone on the polishing pad as the polishing pad rotates below the module.

Due to being spaced along the radial direction of the polishing pad 30, the temperature control modules apply heating or cooling to zones that are spaced along the radial direction of the polishing pad 30.

The size and shape of the zones depends on placement of heating or cooling elements, e.g., resistive heaters, passages for coolant, etc., in the thermal control module 120.

The zones can be rectangular, e.g. as shown by FIG. 2, or some other shape such as trapezoidal (see FIG. 5), oval, arc-shaped, polygonal, or a more complex shape.

In addition, the zones can be the same size and/or shape, e.g., as shown by FIG. 2, but this is not required. Some zones can have different sizes than other zones. For example, the outer zones can be larger than the inner zones (inner and outer are relative to the axis of rotation of the platen). That is, regions further from the axis can be larger than regions closer to the axis. Thus, regions further from the axis can have a wider angular spread than regions closer to the axis. In particular, moving outward from the axis of rotation of the platen, each successive zones can be larger than the prior zone (as shown in FIG. 5).

Components of the temperature control module 120 can be contained within the body 110 such that the body 110 itself serves to thermally conduct heat between the polishing pad and/or slurry and the temperature control module 120. The material of the bottom surface of the body 110 can be formed of a high thermal conductivity material that is also resistant to wear from the polishing pad. The material of the body 110 should be chemically compatible with the polishing process and have high chemical resistance against the polishing liquid. For example, at least the bottom of the body 110 can be a ceramic material, such as silicon carbide, silicon nitride, or aluminum nitride. The entire body 110 can be formed out of the material, or the ceramic material can be coating on a body of another material, e.g., aluminum. Optionally, the thermally conductive material can be coated with a thin CVD diamond coating (analogous to diamond or amorphous diamond-like carbon DLC coatings) to have better wear resistance. The coating can reduce pad wear, improve chemical resistance against the polishing liquid, and have higher thermal conductivity.

Alternatively, components of the temperature control module 120 can be secured to and suspended below the body 110 such that the components are in direct contact with the polishing pad and/or slurry. In this case, the body 110 need not serve to thermally conduct heat between the polishing pad and/or slurry and the temperature control module 120.

For a cooling element, the temperature control module 120 can include a cold-plate style chiller with thermoelectric (TE) cooling element. The cooling element can also be a low-temperature heat exchanger that operates by recirculating low-temperature fluid or gas (i.e., lower than the temperature of the polishing pad and/or polishing liquid). The cooling element can also include a dispenser configured to deliver low-temperature gases or liquids or solids onto the surface of the polishing pad 30. For example, the cooling element can be a nozzle configured to produce a jets of low-temperature gas or liquid. The low-temperature gas, liquid or solid can also undergo endothermic phase changes on the polishing pad surface. In addition, the cooling element can use a combination of the above-mentioned techniques. For example, a cooling element can be formed by stacking a low-temperature heat exchanger on top of a thermoelectric cooling element in order to further enhance the cooling capacity.

For a heating element, the temperature control module 120 can include a hot-plate style heater with thermoelectric (TE) heating element or resistive heating element inside. The heating element can also be a high-temperature heat exchanger that operates by recirculating high-temperature fluid or gas (i.e., higher than the temperature of the polishing pad and/or polishing liquid). The heating element can also include a dispenser configured to deliver high-temperature gases or liquids or solids onto the surface of the polishing pad 30. For example, the heating element can be a nozzle configured to produce a jets of high-temperature gas or liquid. The high-temperature gases or liquids or solids can also undergo exothermic phase changes on the polishing pad surface. The heating element can also be in form of a thermal radiation source, e.g., an infrared (IR) lamp or low intensity laser. In addition, the heating element can use a combination of the above-mentioned techniques. For example, a heating element can be formed by stacking a high-temperature exchanger on top of a thermoelectric heating element in order to further enhance the heating capacity.

The polishing system 20 can also include a controller 90 to control operation of various components, e.g., the temperature control system 100. The controller 90 is configured to receive the temperature measurements from the temperature sensor 64 for each radial zone of the polishing pad. The controller 90 can compare the measured temperature profile to a desired temperature profile, and generate a feedback signal to a control mechanism (e.g., actuator, power source, pump, valve, etc.) for each temperature control module. The feedback signal is calculated by the controller 90, e.g., based on an internal feedback algorithm, to cause the control mechanism to adjust the amount of cooling or heating by the cooling or heating element of the temperature control module such that the polishing pad and/or slurry reaches (or at least moves closer to) the desired temperature profile.

Examples of control techniques include causing a power supply to adjust the intensity of an infrared light source, causing a power supply to adjust an amount of current flowing through a thermoelectric heater or chiller, causing an actuator to move the thermal control module nearer or farther from the polishing pad, causing a pump to increase or decrease the flow rate in a heat exchanger, and causing a valve to adjust a proportion of hot or cold fluid flowing through a heat exchanger.

An example of a control mechanism for the stack of TE cooling element and low-temperature heat exchanger as the cooling element or the stack of TE heating element and high-temperature heat exchanger as the heating element can include (I) controlling the amount of current (or voltage) supplied to the TE element; (II) controlling the relative percentage of the TE element in on and off modes under pulse-width modulation, (III) controlling the relative percentage of the TE element in cooling and heating mode under bipolar modulation; (IV) controlling the temperature or the flow rate of the liquid recirculating inside the low-temperature or high-temperature heat exchanger.

An example of a control mechanism for a resistive heater element can include (I) controlling the amount of current (or voltage) supplied to the resistive heater, and (II) controlling the relative percentage of the resistive heater in on and off modes under pulse-width modulation.

In some implementations, the temperature control modules 120 can provide bi-directional temperature control. Thus, each module 120 can provide selective heating and selective cooling depending on the different processing requirements.

Figure 3:
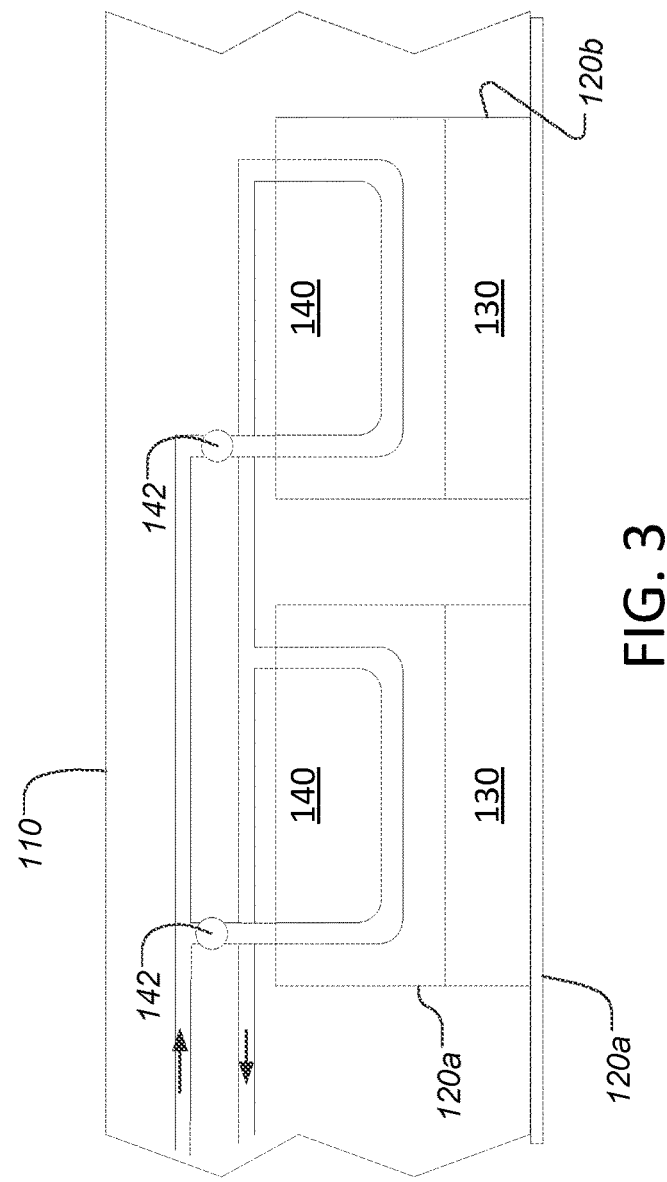
FIG. 3 illustrates a schematic cross-sectional view of a portion of a temperature control system having a plurality of temperature control modules.

In some implementations, the bi-direction temperature control is provided by including both cooling and the heating elements in each temperature control module 120. As an example, referring to FIG. 3, each thermal control module 120 can have a thermal transfer element that includes a stack of a thermoelectric or resistive heating element 130 and a heat exchanger 140. A flow rate through each heat exchanger can be controlled by a valve 142. The heat exchanger 140 can be used as the cooling element, e.g., by flowing low-temperature fluid through the heat exchanger. The thermoelectric or resistive heating element 130 can be used as the heating element, e.g., by flowing a current through the element 130. The heating element and the cooling element can be engaged at different times depending on whether cooling or heating is needed at each stage during polishing.

However, in some implementations, only one thermal transfer element is needed in each temperature control module 120. For example, a thermoelectric element 130 or heat exchanger 140 or can be used as the heating or cooling element, e.g., depending on the direction of current flow or temperature of the fluid flowing through the heat exchanger.

In some implementations, each thermal control module 120 includes a stack of a thermoelectric or resistive heating element 130 and a heat exchanger 140, with both the thermoelectric heating element 130 and the heat exchanger 140 configured for bi-directional temperature control. The temperature control module 120 can be used as the cooling element by (i) selecting the current flow direction for the thermoelectric element 130 to cause heat to being pumped away from the polishing pad and (ii) circulate a low-temperature fluid inside the heat exchanger 140. The same temperature control module 120 can be used as the heating element by (i) switching the current flow direction inside the thermoelectric element 130 (reversing the polarity) to cause heat to be pumped into the pad and (ii) switch from circulating a low-temperature fluid to a high-temperature fluid inside the heat exchanger 140.

Figure 4:
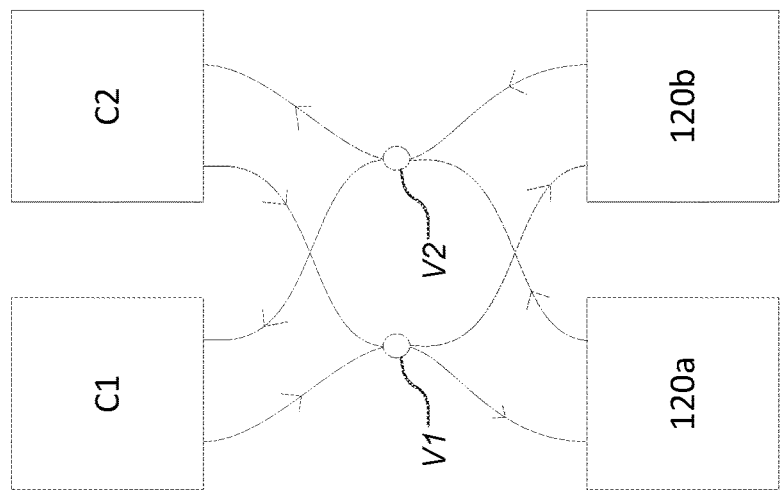
FIG. 4 illustrates a schematic diagram of a heat exchanger for a temperature control system.

For example, referring to FIG. 4, two fluid circulators C1 and C2 can supply fluid at two different temperatures. For example, C1 can pumping cold water whereas C2 can pump hot water. Using the valves V1 and V2, hot or cold fluid can be flown to the temperature control modules 120a and 120b. Example fluids include water and/or etheylne glycol. The fluids can flow at the same time or at different time points. This fluid is used to cool or heat the non-contact side of the thermoelectric module 130.

Returning to FIG. 2, in some implementations, the polishing system 20 includes multiple temperature control systems 100a, 100b, each having its own body 110 with an array 122 of thermal control modules 120. The slurry dispensing arm 39 can be positioned between the two arrays 122 of thermal control modules.

The body of one of the temperature control systems, e.g., the body 110 in the leading position along the direction of rotation (e.g., the body 110 of the system 110b in FIG. 2) relative to the carrier head 70 can serve as a barrier for slurry removal. For example, the body 110 of system 100b can be positioned closer to the polishing pad 30 than the body 110 of system 100a. In operation, polishing liquid can be dispensed by the slurry delivery arm 39, be carried by the pad below and be heated by the array 122 of thermal control modules 120 of the temperature control system 110a, and then carried below the carrier head 70 to interface with the substrate. Used slurry can then be carried from the carrier head 70 and be deflected by the body 110 of the temperature control system 110b to be diverted outside the pad area. The body 110 of the temperature control system 110a can also be positioned to smear the polishing liquid radially across the polishing pad 30.

In some implementations, a temperature control system 100 can use two-stage heating/cooling. A heat pump can serve as the first stage, and a heat exchanger can serve as the second stage. The first stage is closer to the polishing pad.

A design specification for a thermoelectric element's performance is the difference between the cold side and hot side. There are limitations to the difference. For example, assume that a thermoelectric element is used to heat a target surface. The bottom surface of the thermoelectric element would be hot side (and should be hotter than target) and the top surface would be cold side. The target would be placed close to the bottom hot side. Heat transfer occurs from the bottom hot side to the target.

Most thermoelectric elements maintain a set temperature difference between the top and bottom side. However, heating the top side of the thermoelectric element permits the bottom side to get even hotter, which can result in higher efficiency in heat transfer from bottom to target. For example, the top side of the thermoelectric element can be achieved by flowing hot liquid over it. This two stage cooling phenomenon by using the thermoelectric element in series with a heat exchanger, e.g., a water circulator, can be advantageous in CMP. This can be applicable to the reverse cooling phenomenon as well.

Water cannot function as a coolant beyond 0 degrees Celsius. A mixture of water and ethylene glycol is preferred to go below 0 degree Celsius, but often there is a compromise in thermal transfer due to ethylene glycol.

Multiple stacking of thermoelectric elements along the radial direction of the pad with cumulative or individual fluid inlet and outlet would result in zone control of temperature along the CMP pad.

In some implementations, the body 110 also as acts slurry wiper or spreader. For example, referring to FIG. 2, polishing liquid can be distributed from arm 39. Due to the rotation of the platen 24, slurry will be carried on the polishing pad 30 toward the temperature control system 100a. In particular, assuming that the body 110 is positioned to contact the polishing pad 30, the bottom edge of the trailing surface (the surface opposite to the direction of rotation) will serve as a barrier to restrain the flow of the slurry from the arm 39. As a result, slurry that does pass below the body 110, e.g., in grooves in the polishing pad 30 or through the gap between the body 110 and the polishing pad 30, will be distributed more uniformly.

Possible advantages include the following.

(I) The apparatus is essentially a dedicated, self-contained hardware to control the surface temperature of the polishing pad during the CMP process.

(II) The apparatus does not rely on controlling the pad surface temperature by adjusting CMP processing parameters such as the downforce of the polishing head or the pad conditioner disk. As a result, this temperature control apparatus will have less impact on the existing CMP processes.

(III) With certain choices of the elements in the thermal control modules, for example, when using the stack of a theremoelectric element and a heat exchanger as described above, the temperature control apparatus has less disturbance to the polishing pad surface, e.g., as compared to vortexes of air or jets of deionized water for cooling purposes.

(IV) With certain choices of the elements in the thermal control modules, for example, when using the stack of thermoelectric element and the heat exchanger as described above, the temperature control apparatus can realize bi-directional temperature control including both cooling and heating in the same thermal control module. Therefore the footprint of the new apparatus can be small during implementation. In addition, the bi-directional temperature control enables a new processing knob that can be adjusted at different stages throughout a CMP process to achieve the improved CMP outcomes as measured by throughput, topography, residue, corrosion, etc.

(V) The within pad temperature non-uniformity during a CMP process can be reduced using multiple temperature control modules in the modular array. Further, with certain choices of the elements in the thermal control modules, for example, when using the stack of thermoelectric element and the heat exchanger as described above, there are multiple levels of control mechanisms to provide more reliable temperature control in each individual module in order to reach the desired temperature or rate of temperature change in each radial zone and to reduce temperature non-uniformity on the polishing pad surface.

The above described polishing apparatus and methods can be applied in a variety of polishing systems. Either the polishing pad, or the carrier heads, or both can move to provide relative motion between the polishing surface and the substrate. For example, the platen may orbit rather than rotate. The polishing pad can be a circular (or some other shape) pad secured to the platen. Some aspects of the endpoint detection system may be applicable to linear polishing systems, e.g., where the polishing pad is a continuous or a reel-to-reel belt that moves linearly. The polishing layer can be a standard (for example, polyurethane with or without fillers) polishing material, a soft material, or a fixed-abrasive material. Terms of relative positioning are used to refer to relative positioning within the system or substrate; it should be understood that the polishing surface and substrate can be held in a vertical orientation or some other orientation during the polishing operation.

Functional operations of the controller 90 can be implemented using one or more computer program products, i.e., one or more computer programs tangibly embodied in a non-transitory computer readable storage media, for execution by, or to control the operation of, data processing apparatus, e.g., a programmable processor, a computer, or multiple processors or computers.

A number of embodiments of the invention have been described. Nevertheless, it will be understood that various modifications may be made without departing from the spirit and scope of the invention. Accordingly, other embodiments are within the scope of the following claims.

What is claimed is:
1. A chemical mechanical polishing apparatus comprising:
   a platen to hold a polishing pad;
   a carrier to hold a substrate against a polishing surface of the polishing pad during a polishing process;
   a dispenser to supply a polishing liquid to the polishing surface;

a temperature control system including a body configured to contact the polishing surface or the polishing liquid on the polishing surface, the body supporting a thermal control module positioned over the polishing pad, wherein the thermal control module comprises a stack including a thermoelectric heat pump and a heat exchanger; and an actuator to adjust a vertical position of the body relative to the polishing pad.

2. The apparatus of claim 1, wherein the body comprises a linear arm of substantially uniform width.

3. The apparatus of claim 1, wherein the body comprises a wedge-shaped arm.

4. The apparatus of claim 1, wherein at least a portion of the body that contacts the polishing pad or polishing liquid comprises a ceramic.

5. The apparatus of claim 4, wherein the body is ceramic.

6. The apparatus of claim 4, wherein the portion of the body comprises a coating of ceramic on another material.

7. The apparatus of claim 1, wherein at least a portion of the body that contacts the polishing pad or polishing liquid comprises silicon carbide, silicon nitride aluminum nitride, diamond or diamond-like carbon.

8. The apparatus of claim 1, wherein the heat exchanger is above the thermoelectric heat pump.

9. The apparatus of claim 8, comprising a controller configured to control a current to the thermoelectric heat pump to cause the heat pump to drive heat to or from the polishing pad, and to control a temperature or flow rate of fluid passing through the heat exchanger to cause the heat exchanger to raise or lower a temperature of a top surface of the thermoelectric heat pump.

10. The apparatus of claim 9, further comprising a polishing liquid supply port to distribute polishing liquid onto the polishing pad, and wherein the body is positioned to provide a barrier to flow of the polishing liquid.

11. The apparatus of claim 1, wherein a portion of the body is positioned between the thermal control module and the polishing pad or the polishing liquid.

12. A chemical mechanical polishing apparatus comprising:

a platen to hold a polishing pad;

a carrier to hold a substrate against a polishing surface of the polishing pad during a polishing process;

a temperature control system including a plurality of thermal control modules positioned above the polishing pad, each thermal control module including a stack including a thermoelectric heat pump and a heat exchanger having a passage to receive a fluid and exchange heat between the polishing pad and the fluid, the temperature control system further including a plurality of fluid circulators to supply fluid at two different temperatures, and a plurality of valves to selectively fluidically couple each of the plurality of fluid circulators to each of the heat exchangers.

13. The apparatus of claim 12, wherein the heat exchanger is above the thermoelectric heat pump.

14. The apparatus of claim 12, comprising a controller configured to control a current to the thermoelectric heat pump to cause the heat pump to drive heat to or from the polishing pad, and to control a temperature or flow rate of fluid passing through the heat exchanger to cause the heat exchanger to raise or lower a temperature of a top surface of the thermoelectric heat pump.

15. The apparatus of claim 12, wherein the temperature control system includes a body configured to contact the polishing surface or [[the]] a polishing liquid on the polishing surface, wherein the body supports the thermal control modules over the polishing pad.

16. The apparatus of claim 15, further comprising an actuator to adjust a vertical position of the body relative to the polishing pad.

17. The apparatus of claim 15, further comprising a polishing liquid supply port to distribute polishing liquid onto the polishing pad, and wherein the body is positioned to provide a barrier to flow of the polishing liquid.

* * * * *

UNITED STATES PATENT AND TRADEMARK OFFICE
CERTIFICATE OF CORRECTION

| | |
|---|---|
| PATENT NO. | : 11,597,052 B2 |
| APPLICATION NO. | : 16/448980 |
| DATED | : March 7, 2023 |
| INVENTOR(S) | : Hari Soundararajan et al. |

It is certified that error appears in the above-identified patent and that said Letters Patent is hereby corrected as shown below:

In the Claims

Column 11, Line 22, in Claim 7, insert a --,-- after "silicon nitride".

Column 12, Line 28, in Claim 15, after "or", delete "[[the]]".

Signed and Sealed this
Sixteenth Day of May, 2023

Katherine Kelly Vidal
*Director of the United States Patent and Trademark Office*